(12) United States Patent
Linde et al.

(10) Patent No.: US 11,125,112 B2
(45) Date of Patent: Sep. 21, 2021

(54) INNER FIXED STRUCTURE LEADING EDGE LATCH

(71) Applicant: Rohr, Inc., Chula Vista, CA (US)

(72) Inventors: Erik Linde, Coronado, CA (US); Matthew Aaron Farr, San Diego, CA (US); Angelica Dahmen, San Diego, CA (US); Gustavo DelCampo-Gonzalez, Chula Vista, CA (US); Carlos A Lopez, Chula Vista, CA (US); Hassan Zaidi, San Marcos, CA (US)

(73) Assignee: Rohr, Inc., Chula Vista, CA (US)

( * ) Notice: Subject to any disclaimer, the term of this patent is extended or adjusted under 35 U.S.C. 154(b) by 120 days.

(21) Appl. No.: 16/680,266

(22) Filed: Nov. 11, 2019

(65) Prior Publication Data

US 2020/0095892 A1   Mar. 26, 2020

Related U.S. Application Data

(62) Division of application No. 14/672,193, filed on Mar. 29, 2015, now Pat. No. 10,508,566.

(51) Int. Cl.
| | |
|---|---|
| *F01D 25/24* | (2006.01) |
| *B64D 29/08* | (2006.01) |
| *B64D 29/06* | (2006.01) |
| *F01D 21/00* | (2006.01) |
| *F02K 1/76* | (2006.01) |
| *F02C 7/20* | (2006.01) |

(52) U.S. Cl.
CPC .............. *F01D 25/24* (2013.01); *B64D 29/06* (2013.01); *B64D 29/08* (2013.01); *F01D 21/00* (2013.01); *F02C 7/20* (2013.01); *F02K 1/766* (2013.01); *F05D 2220/323* (2013.01); *F05D 2230/642* (2013.01); *F05D 2240/91* (2013.01); *F05D 2260/30* (2013.01)

(58) Field of Classification Search
CPC . Y10T 403/30; Y10T 403/59; Y10T 403/591; Y10T 403/597; Y10T 403/598; B64D 29/06; B64D 29/08; F01D 25/265; F02C 7/20; F05D 2260/30; B64C 1/14; B64C 1/1407; B64C 1/1423; B64C 1/143; B64C 1/1446
See application file for complete search history.

(56) References Cited

U.S. PATENT DOCUMENTS

| | | | |
|---|---|---|---|
| 4,365,775 | A | 12/1982 | Glancy |
| 4,549,708 | A | 10/1985 | Norris |
| 5,203,215 | A | 4/1993 | Baudu et al. |

(Continued)

FOREIGN PATENT DOCUMENTS

WO   2014151275   9/2014

OTHER PUBLICATIONS

Extended European Search Report dated Aug. 24, 2016 in European Application No. 16162671.8.

(Continued)

*Primary Examiner* — Jonathan P Masinick
(74) *Attorney, Agent, or Firm* — Snell & Wilmer L.L.P.

(57) ABSTRACT

Pin latch assemblies and cam latch assemblies are disclosed. A pin latch assembly is provided comprising a pin housing at least partially enclosing a pin, an actuating device coupled to the pin, and a retaining feature comprising an aperture.

4 Claims, 10 Drawing Sheets

(56) References Cited

U.S. PATENT DOCUMENTS

| | | |
|---|---|---|
| 7,275,362 B2 | 10/2007 | Strunk et al. |
| 8,439,298 B2 | 5/2013 | Porte et al. |
| 8,757,546 B2 | 6/2014 | Porte et al. |
| 9,004,855 B2 | 4/2015 | Vauchel et al. |
| 9,239,030 B2 | 1/2016 | Mercier et al. |
| 9,567,089 B2 | 2/2017 | Layland et al. |
| 9,708,073 B2 | 7/2017 | Pretty et al. |
| 2006/0059886 A1 | 3/2006 | Strunk et al. |
| 2010/0284806 A1* | 11/2010 | Vauchel ................ B64D 29/08 415/214.1 |
| 2011/0014044 A1 | 1/2011 | Vauchel et al. |
| 2011/0113837 A1 | 5/2011 | Soulier et al. |
| 2011/0174930 A1 | 7/2011 | Porte et al. |
| 2013/0323013 A1 | 12/2013 | Mercier et al. |
| 2016/0084113 A1 | 3/2016 | Sawyers-Abbott et al. |

OTHER PUBLICATIONS

European Patent Office, European Office Action dated Apr. 3, 2018 in Application No. 16162671.8-1007.
USPTO, Non Final Office Action dated Sep. 6, 2017 in U.S. Appl. No. 14/672,193.
USPTO, Non Final Office Action dated Mar. 27, 2018 in U.S. Appl. No. 14/672,193.
USPTO, Final Office Action dated Sep. 18, 2018 in U.S. Appl. No. 14/672,193.
USPTO, Advisory Action dated Oct. 30, 2018 in U.S. Appl. No. 14/672,193.
USPTO, Non Final Office Action dated Feb. 5, 2019 in U.S. Appl. No. 14/672,193.
USPTO, Final Office Action dated Jun. 7, 2019 in U.S. Appl. No. 14/672,193.
USPTO, Notice of Allowance dated Sep. 6, 2019 in U.S. Appl. No. 14/672,193.

* cited by examiner

INNER FIXED STRUCTURE LEADING EDGE LATCH

CROSS-REFERENCE TO RELATED APPLICATIONS

This application is a divisional of, and claims priority to, and the benefit of U.S. Non-Provisional application Ser. No. 14/672,193, entitled "INNER FIXED STRUCTURE LEADING EDGE LATCH," filed on Mar. 29, 2015, which is hereby incorporated by reference in its entirety.

FIELD

The present disclosure relates to latch assemblies capable of being used in an aircraft nacelle, and more particularly to a latch between the leading edge of an inner fixed structure of a propulsion system thrust reverser and the engine case.

BACKGROUND

A bypass duct of a nacelle may be disposed about a gas turbine engine. The bypass duct may be at least partially defined by an inner fixed structure (IFS) of a thrust reverser. Under certain conditions, an overpressure event underneath the IFS may cause the IFS to deflect in a radially outward direction with respect to the gas turbine engine. If the leading edge of the IFS deflects enough into the bypass duct, it will begin to scoop the high velocity air within the duct, which will result in a further increase of forces and additional deflection. Such deflection, if extreme, may damage the IFS and jeopardize its integrity.

SUMMARY

Pin latch assemblies and cam latch assemblies are disclosed. A latch assembly located between a leading edge of an inner fixed structure (IFS) and an engine case is provided comprising a moveable portion, a handle, a receiver, wherein the latch assembly is configured to be in a latched position when the moveable portion is located within the receiver, wherein the receiver and the moveable portion comprise a waiting-fail-safe load path when in the latched position, wherein the handle is coupled to a fan case, wherein the handle is coupled to the moveable portion via a flexible cable, wherein the flexible cable is routed through a guide vane, the guide vane being located between the engine case and the fan case.

A latch assembly located between a leading edge of an inner fixed structure (IFS) and an engine case is provided comprising a moveable portion, a handle, a receiver, wherein the latch assembly is configured to be in a latched position when the moveable portion is located within the receiver, wherein the receiver and the moveable portion comprise a waiting-fail-safe load path when in the latched position, wherein the moveable portion is remotely actuated by a flexible cable, wherein the flexible cable is toured through a guide vane between the engine case and a fan case.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "outboard" may define an element or portion of an element that is situated radially outer to or away from another, radially inward, element or portion of an element. Thus, an engine core may be situated radially inboard of an inner fixed structure ("IFS") and/or a fan casing, as described herein. As used herein, "inboard" may define the element or portion of the element that is situated radially inward in relation to an outboard element.

Figure 1A:
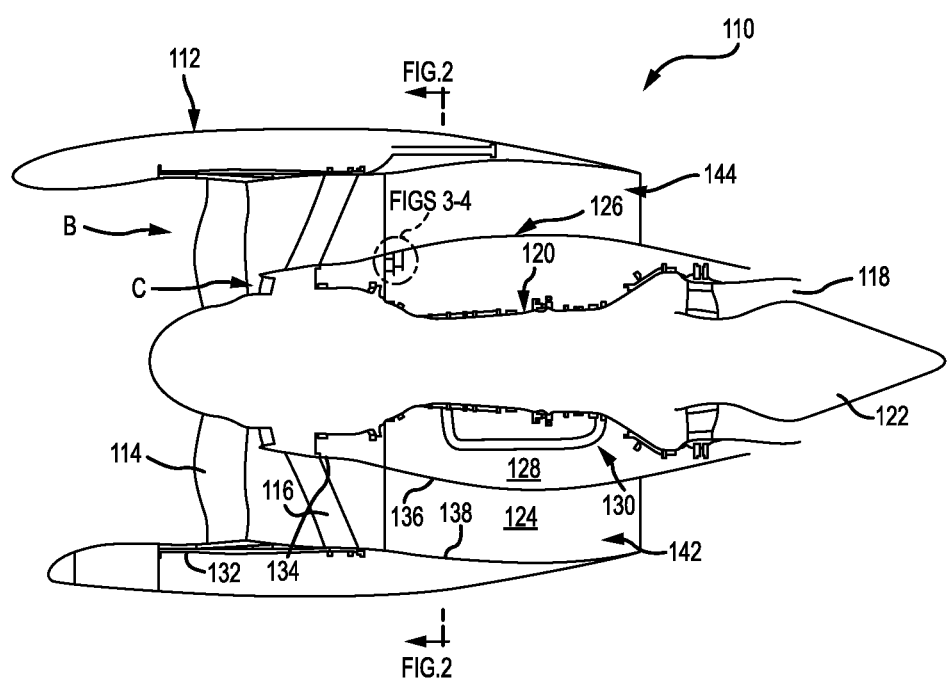
FIG. 1A illustrates a schematic view of a gas turbine engine, in accordance with various embodiments.

According to various embodiments, FIG. 1A illustrates a schematic sectional view of a gas turbine engine. Gas turbine engine 110 may include core engine 120. Core air flow C flows through core engine 120 and is expelled through exhaust outlet 118 surrounding exhaust centerbody 122.

Core engine 120 drives a fan 114 arranged in a bypass flow path 124. Bypass air flow B, driven by the fan 114, flows in the aft direction through bypass flow path 124. At least a portion of bypass flow path 124 may be defined by nacelle structure 112 and inner fixed structure (IFS) 126. As is known, the general shape of IFS 126 is a surface of revolution around the engine axis, often with two bifurcation panels at the six o'clock and the twelve o'clock position which extend radially outward, and the IFS is often made from two generally mirror image clam shell halves that hinge together as part of the thrust reverser structure. The radially-outboard surface of IFS 126 may be referred to as an inner flow surface 136 of the bypass flow path 124, and the radially-inboard surface of nacelle structure 112 may be referred to as an outer flow surface 138 of the bypass flow path 124. Fan case 132 may surround fan 114. Fan case 132 may be housed within nacelle structure 112.

Figure 1B:
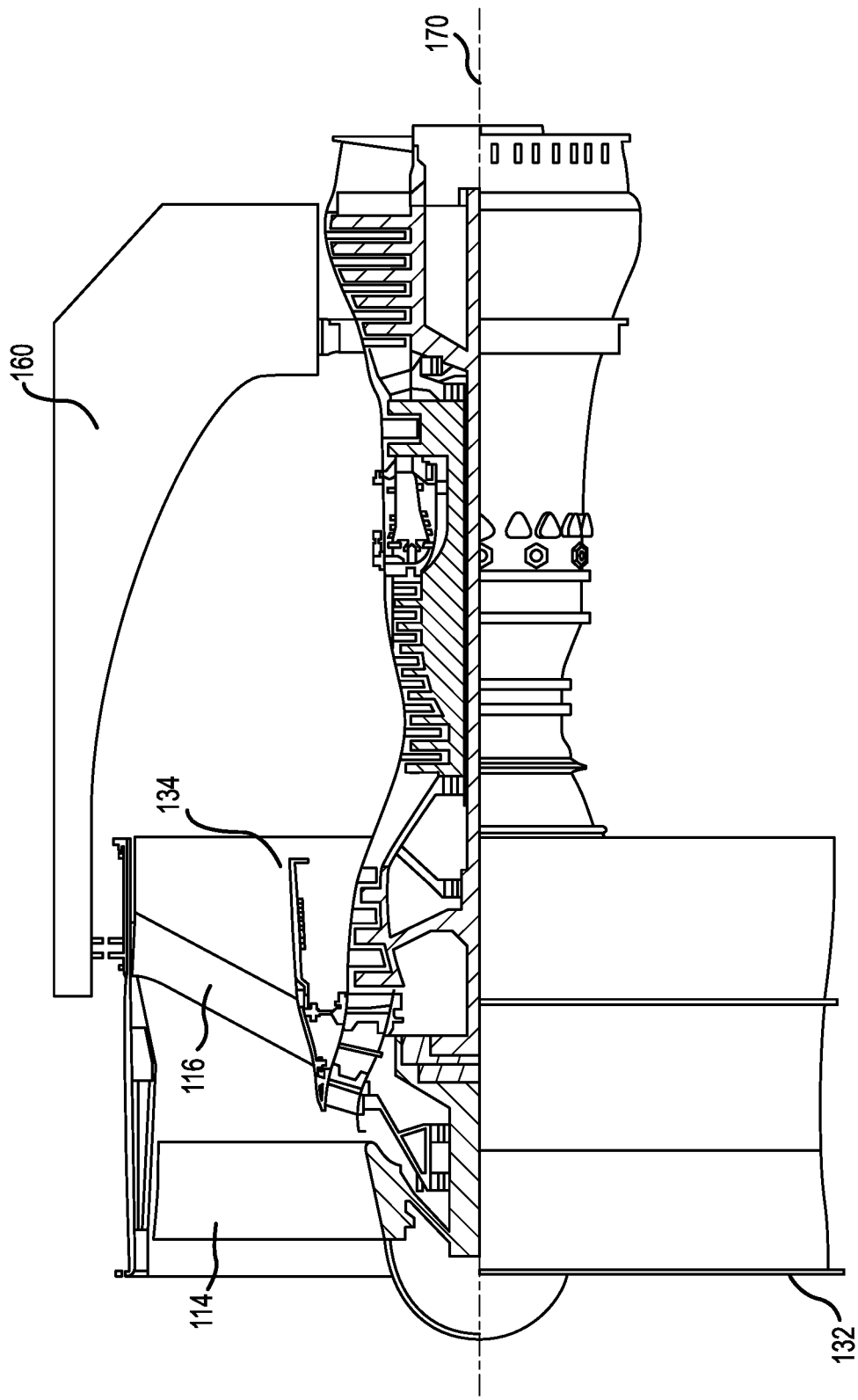
FIG. 1B illustrates a schematic view of a gas turbine engine attached to a pylon, in accordance with various embodiments.

With reference to FIG. 1B, intermediate case (IMC) 134 of the gas turbine engine 110 may be provided radially inward of fan case 132. Fan case 132 may provide mounting structure for securing gas turbine engine 110 to a pylon 160. IMC 134 may be surrounded by nacelle structure 112. According to various embodiments, multiple guide vanes 116 may extend radially between fan case 132 and IMC 134.

Upper bifurcation 144 and lower bifurcation 142 are the spaces between opposite upper and lower bifurcation panels of IFS 126 clamshell halves and may be used to accommodate the routing of engine components such as wires, air ducts, and fluids conduits.

Inner fixed structure 126 surrounds core engine 120 and helps define core compartment 128. Various components may be provided in core compartment 128 such as compressed air valves and/or a compressed air duct 130, for example. Compressed air duct 130 may carry high temperature and high pressure compressed air for anti-icing purposes for several aircraft surfaces.

Figure 2A:
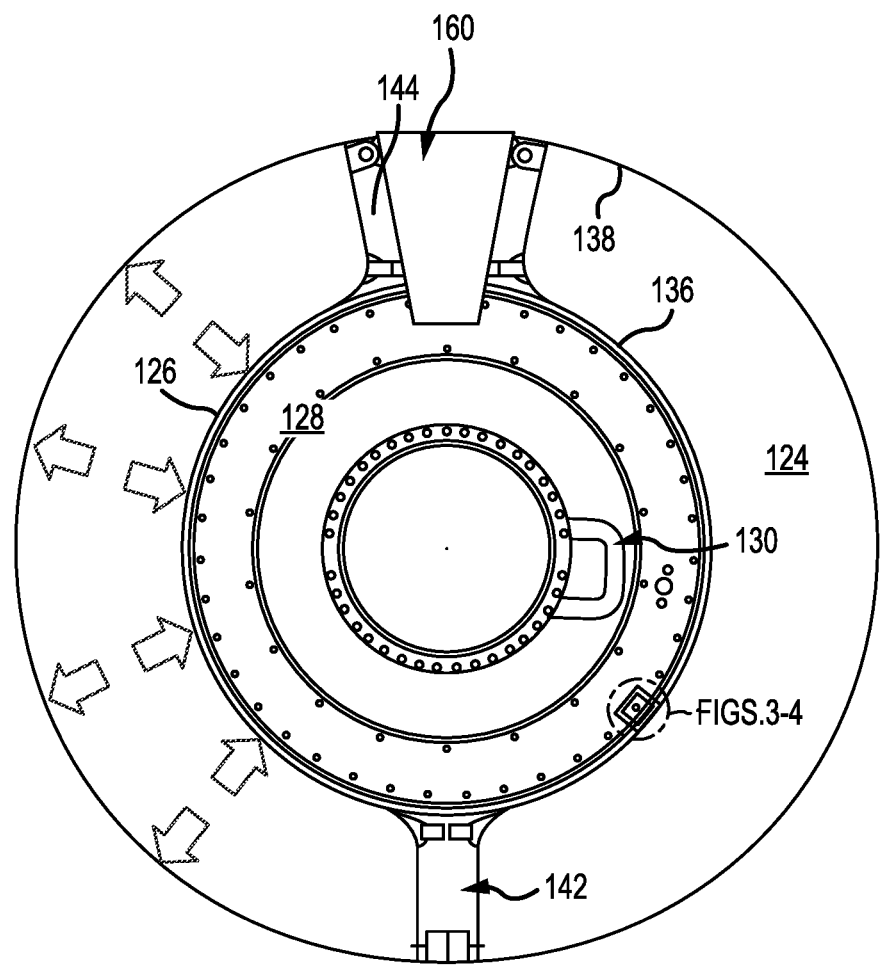
FIG. 2A illustrates a cross-sectional view of the gas turbine engine taken along line 2-2 in FIG. 1A and under normal operating conditions, in accordance with various embodiments.

According to various embodiments, FIG. 2A illustrates a cross-sectional view of the gas turbine engine taken from approximately along line 2-2 in FIG. 1A and under normal operating conditions. Typically, the bypass flow path 124 will exert radially outward pressure on the inner flow surface 136 and radially inward pressure on outer flow surface 138.

Figure 2B:
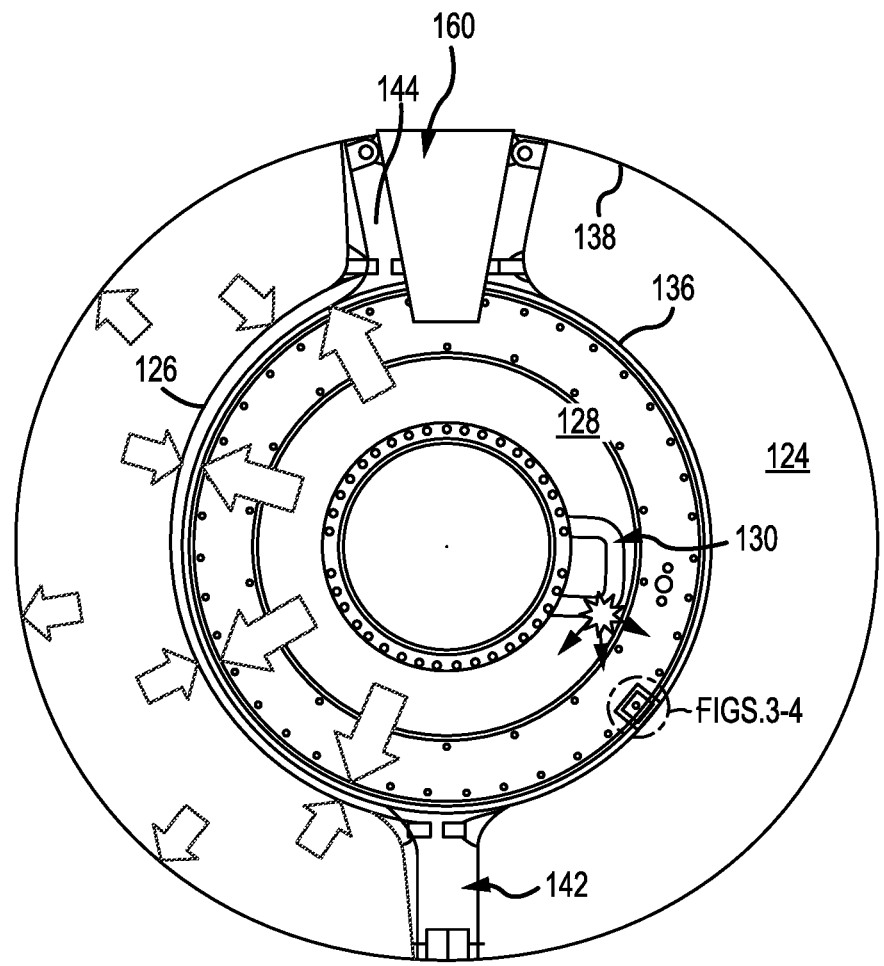
FIG. 2B illustrates a cross-sectional view of the gas turbine engine taken along line 2-2 in FIG 1A and under an overpressure event, in accordance with various embodiments.

FIG. 2B illustrates a cross-sectional view of the gas turbine engine taken along line 2-2 in FIG. 1A and under an overpressure event with a portion of the IFS in a deflected state. From time to time, a core compartment 128 may experience more air pressure than it is typically designed to handle (i.e., an overpressure event), for example in the event that compressed air duct 130 bursts. An overpressure event tends to exert a radially outward pressure upon the IFS 126. The pressure exerted radially outward upon the IFS 126 may be greater than the pressure exerted radially inward on the IFS from the bypass flow path 124. In response, a portion of the IFS 126 may deflect radially outwards. If the radially outward deflection of the leading edge of IFS 126 is too great, it will begin to scoop the high velocity air in the bypass flow path 124, which may cause even greater deflections of IFS 126 and a potential loss of structural integrity or permanent damage.

Accordingly, latch assemblies between the leading edge of the IFS and the intermediate fan case may be provided to prevent the IFS from deflecting relative to an intermediate fan case in the event of an overpressure event (e.g., a burst duct). However, during normal operation, the IFS and the intermediate fan case may need to deflect relative to one another. Therefore, the latch assemblies must accommodate these deflections. Preferably, the latch assemblies do not take any load as a result of normal deflections between the IFS and the intermediate fan case, and are in waiting-fail-safe mode to only take loads in case of more severe deflections caused by a burst duct.

Figure 3A:
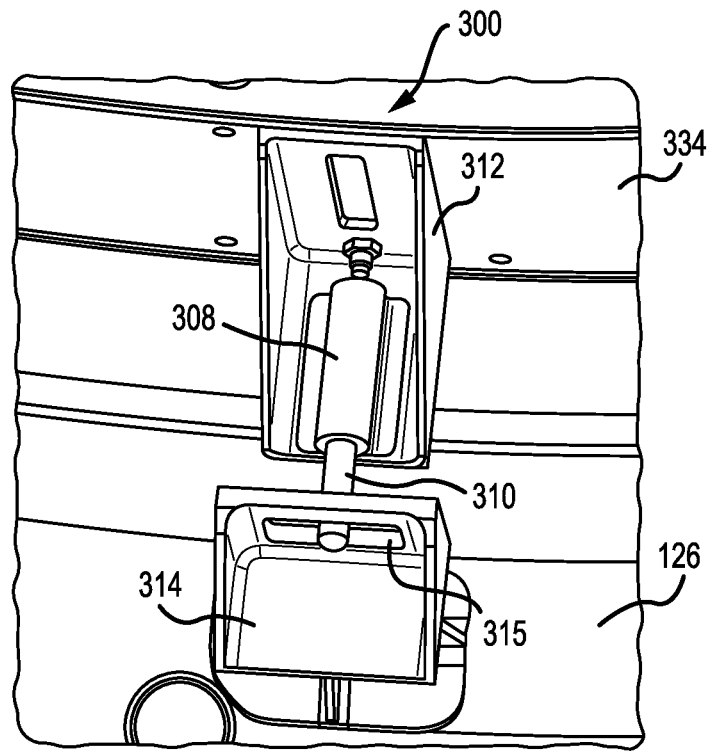
FIG. 3A, illustrates an isometric view of an exemplary pin latch assembly in the closed position, in accordance with various embodiments.
Figure 3B:
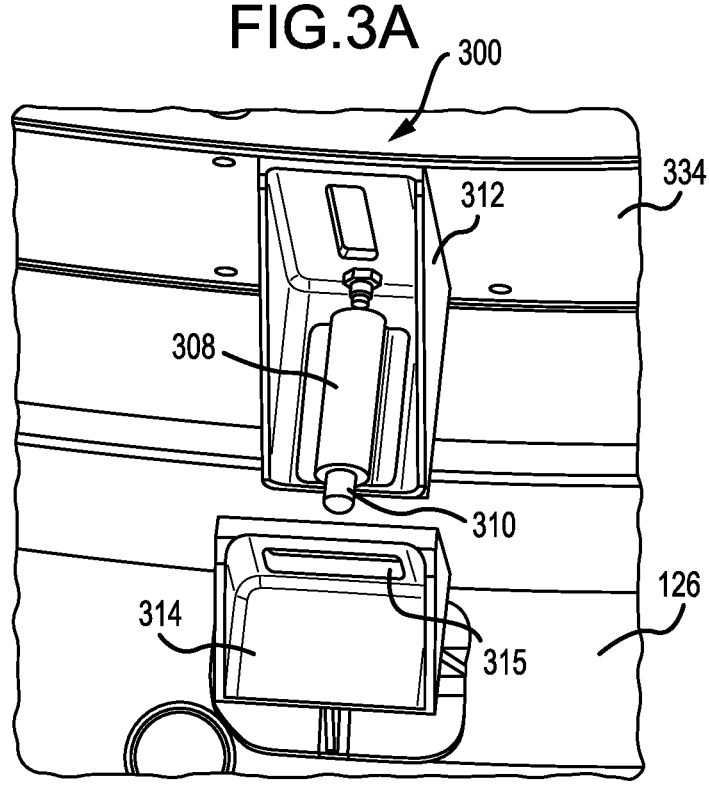
FIG. 3B illustrates an isometric view of an exemplary pin latch assembly in the open position, in accordance with various embodiments.

With reference to FIG. 3A, an exemplary pin latch assembly in the closed position is illustrated. According to various embodiments, pin latch assembly 300 may comprise a pin latch mount 312, a pin housing 308, a pin retainer 314, and a pin 310. Pin latch mount 312 may be attached to the radially inside surface of IMC bulkhead 334 near its trailing edge. Pin housing 308 may be attached to pin latch mount 312. Pin housing 308 allows pin 310 to slide inside of it. Pin retainer 314 may be attached to the radially inside surface of IFS 126 near its leading edge. Pin retainer 314 may comprise a slotted hole 315 configured to allow pin 310 to pass through slotted hole 315. Pin 310 may be configured to reciprocate within pin housing 308 between an extended and retracted position. The extended position may be defined as a position where pin 310 is extended from pin housing 308 such that at least a portion of pin 310 may pass into slotted hole 315. The retracted position may be defined as a position where pin 310 is retracted inside of pin housing 308. The pin latch assembly 300 is capable of an unlatched position where the pin 310 is retracted and not located inside of slot 315, and a latched position where pin 310 is extended and located inside of slot 315.

According to various embodiments, pin latch mount 312 may be attached to IMC bulkhead 334 via fasteners such as a threaded pin/threaded fastener such as that sold under the trademark HI-LOK, for example. According to various embodiments, pin retainer 314 may be attached to IFS 126 via fasteners. According to various embodiments, pin housing 308 may be attached to pin latch mount 312 via welding or fasteners. According to various embodiments, pin latch mount 312, pin housing 308, pin retainer 314, and pin 310 may comprise of any metal, such as stainless steel or aluminum, for example.

When pin latch assembly 300 is latched, a portion of pin 310 has passed into slotted hole 315, and a waiting-fail-safe load path may be created between IFS 126 and IMC bulkhead 334 by, for example, sizing pin 310 so that its diameter is less than the width of slotted hole 315. Pin 310 can move inside of slotted hole 315 to accommodate normal deflections between IMC bulkhead 334 and IFS 126 without taking load.

During an overpressure event, IFS 126 may deflect radially outward, causing pin 310 to contact pin retainer 314. In this manner, pin latch assembly 300 may arrest any additional IFS deflection by creating a load path which may travel from IFS 126, through pin retainer 314, through pin 310, through pin housing 308, through pin latch mount 312, and into IMC bulkhead 334. Accordingly, pin latch assembly 300 may prevent damaging, excessive IFS deflection during an overpressure event. Deflections of the IFS 126 leading edge may be the most important to control in order to ensuring that a scooping condition does not occur, and pin latch assembly 300, positioned between the leading edge of IFS 126 and the trailing edge of IMC bulkhead 334, is well positioned to arrest such deflections.

Figure 3C:
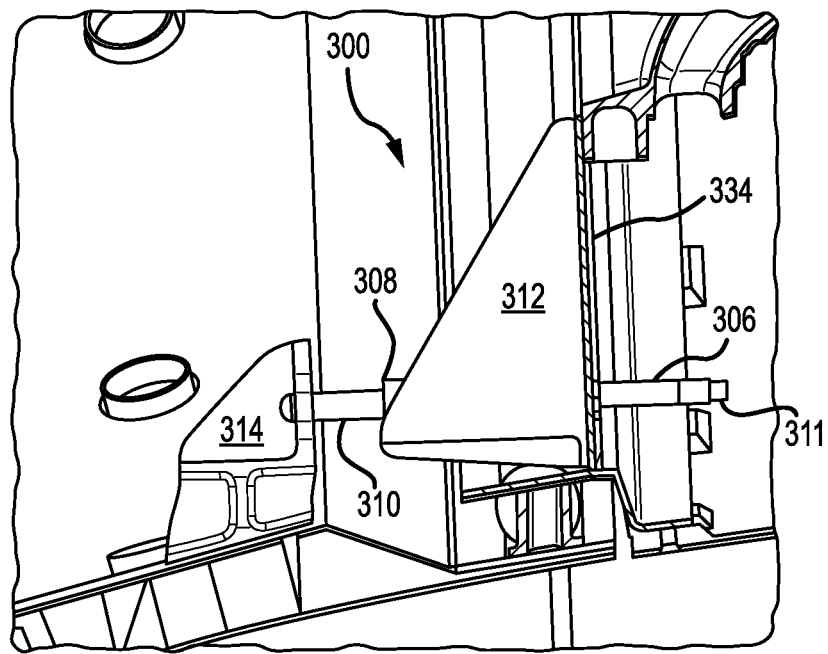
FIG. 3C illustrates a side view of an exemplary pin latch assembly in the closed position, in accordance with various embodiments.
Figure 3D:
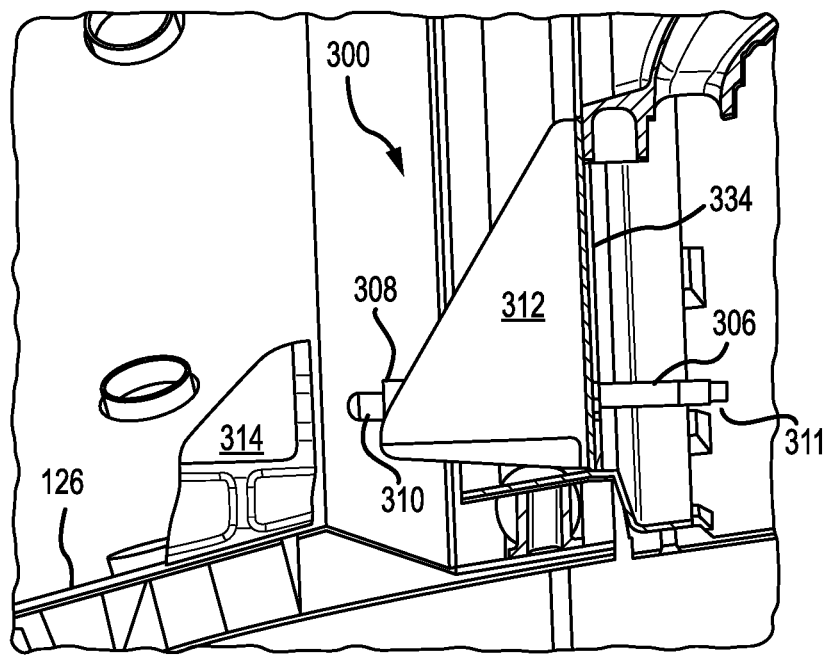
FIG. 3D illustrates a side view of an exemplary pin latch assembly in the open position, in accordance with various embodiments.

With reference to FIG. 3C and FIG. 3D, a side view of exemplary pin latch assembly 300 in the latched and unlatched positions, respectively, is illustrated, in accordance with various embodiments. An actuating device, such as cable 311, may be coupled to pin 310 to cause pin 310 to translate with respect to pin retainer 314. Pin 310 may be attached to cable 311 via a coupler such as a clevis, for example. Pin 310 may be attached to cable 311 via weld, solder, or any other suitable method. According to various embodiments, pin 310 and cable 311 may be integrally manufactured. Though shown as cable 311, any suitable actuating device is contemplated herein to cause pin 310 to translate with respect to pin retainer 314.

Figure 5A:
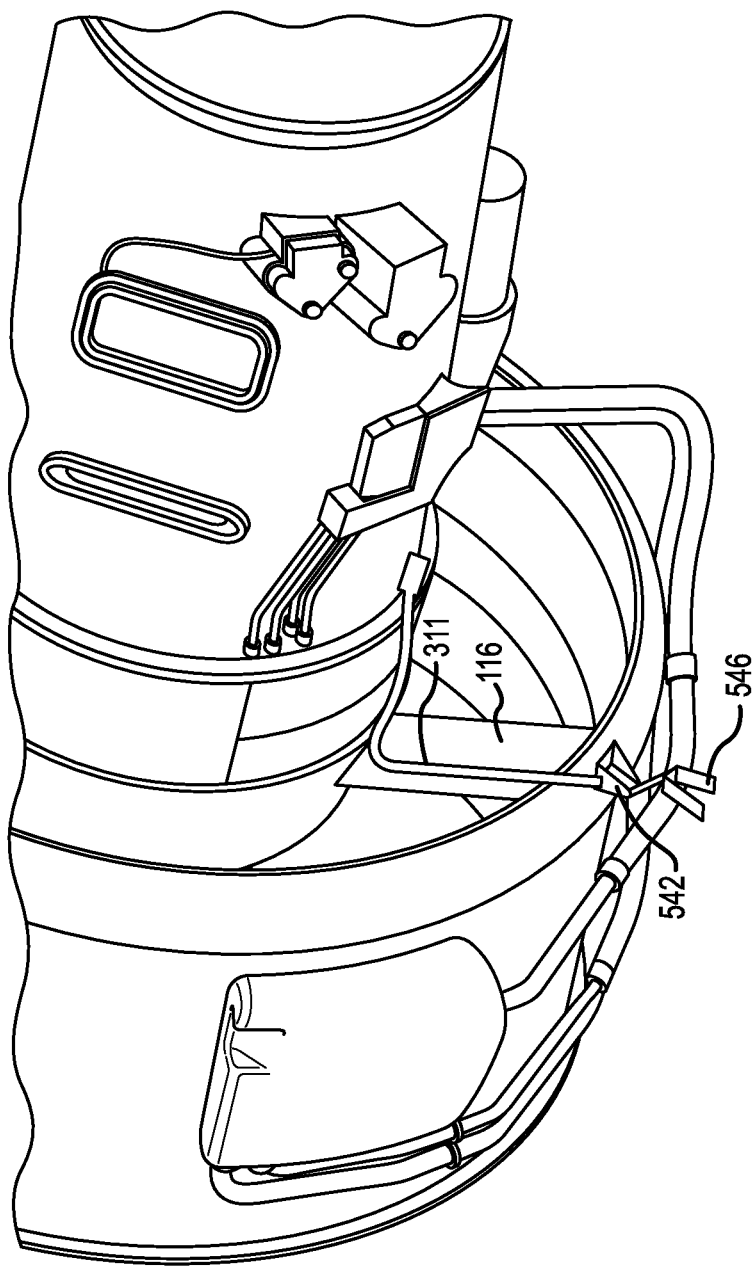
FIG. 5A illustrates a latch handle assembly with cable placement, in accordance with various embodiments.

In accordance with various embodiments, FIG. 5A illustrates a latch handle assembly with cable placement. A cable sleeve 306 may be provided to enclose cable 311. Cable sleeve 306 may be attached to and extend from pin latch mount 312 or pin housing 308 on one end to a latch handle 542 on the other end to form a flexible cable actuation system, as is known. As illustrated by FIG. 5A, cable 311 may be routed from pin latch assembly 300 (with reference to FIG. 3A) along the radially-inward surface of IMC bulkhead 334, then through the bulkhead and through a hollow portion of one of guide vanes 116 and through the fan case, and finally to latch handle 542, in accordance with various embodiments. Latch handle 542 may be attached to fan case 132 (with reference to FIG. 1B). Latch handle 542 permits latching and unlatching of pin latch assembly 300 remotely (with reference to FIG. 3A).

Figure 5B:
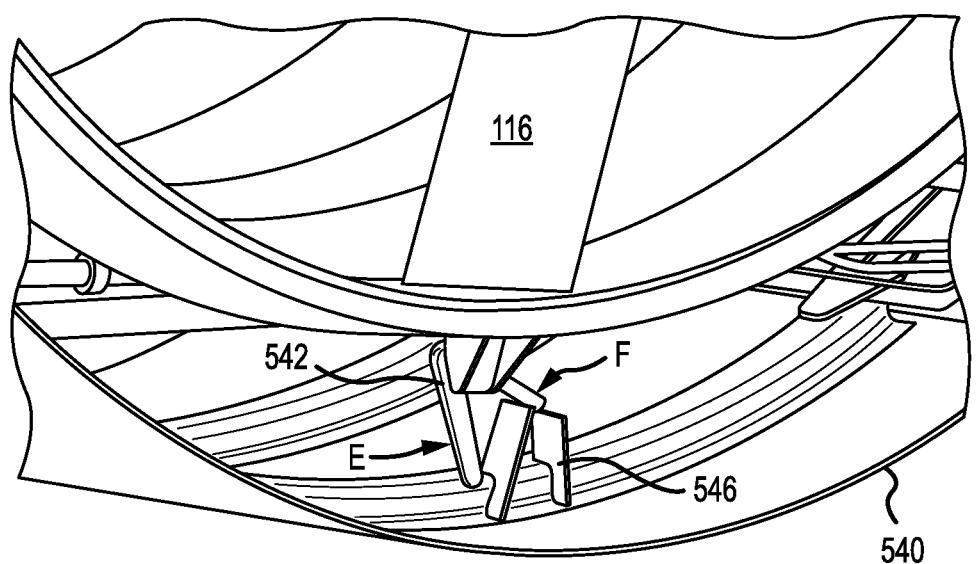
FIG. 5B illustrates a latch handle security device with a fan cowl in the closed position, in accordance with various embodiments.

With reference to FIG. 5B, when latch handle 542 is opened, cable 311 may be tensioned, causing the pin 310 to retract and the pin latch assembly 300 to unlatch. When latch handle 542 is closed, cable 311 may be compressed causing the pin latch assembly 300 to latch.

A balking device is provided to prevent a fan cowl 540 from closing when latch handle 542 is opened and pin latch assembly 300 is unlatched. Balking device 546 may be a tab which extends radially inward from fan cowl 540. When fan cowl 540 moves toward its closed position, balking device 546 will contact an open latch handle 542 and the fan cowl will not close further. This helps ensure that the latch handle 542 is moved to the closed position and the pin latch assembly 300 is latched before the fan cowl is closed.

In addition to pin latch mount 312 being attached to IMC bulkhead 334 and pin retainer 314 being attached to IFS 126, pin latch mount 312 and pin retainer 314 may be located in inverse locations. In such an embodiment, the cable 311 could be routed along the radially inner surface of the IFS 126 to a handle located in the lower bifurcation 142.

In addition to the pin latch assembly 300, a cam latch assembly is disclosed. With reference to FIG. 4A, FIG. 4B, FIG. 4C and FIG. 4D, a view of an exemplary cam latch assembly in the closed position and open position respectively is illustrated, in accordance with various embodiments. According to various embodiments, cam latch assembly 400 may comprise a cam latch mount 412, a cam retainer 414, and a cam 410. Cam latch mount 412 may be attached to a radially inner surface of IMC bulkhead 334. Cam retainer 414 may be attached to a radially inner surface (opposite flow surface 136) of IFS 126. Cam retainer 414 may comprise an opening 415 configured to allow cam 410 to position itself within opening 415 (also referred to as a channel) when the cam latch assembly is latched. Cam 410 may be attached to cam latch mount 412 via pivoting pin 422. Cam 410 may be configured to pivot about pivoting pin 422 during unlatching and latching.

Figure 4A:
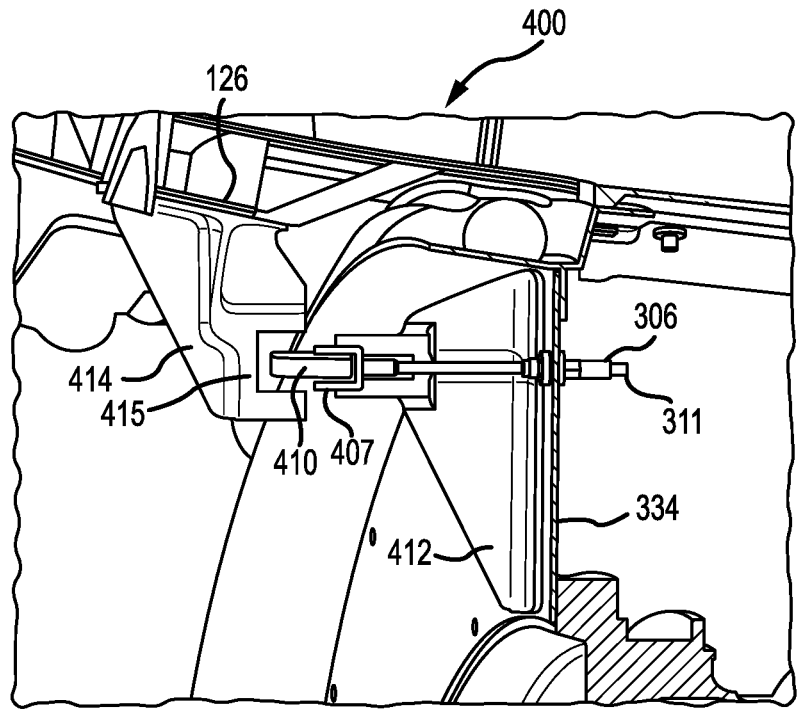
FIG. 4A, illustrates an isometric view of an exemplary cam latch assembly in the closed position, in accordance with various embodiments.
Figure 4B:
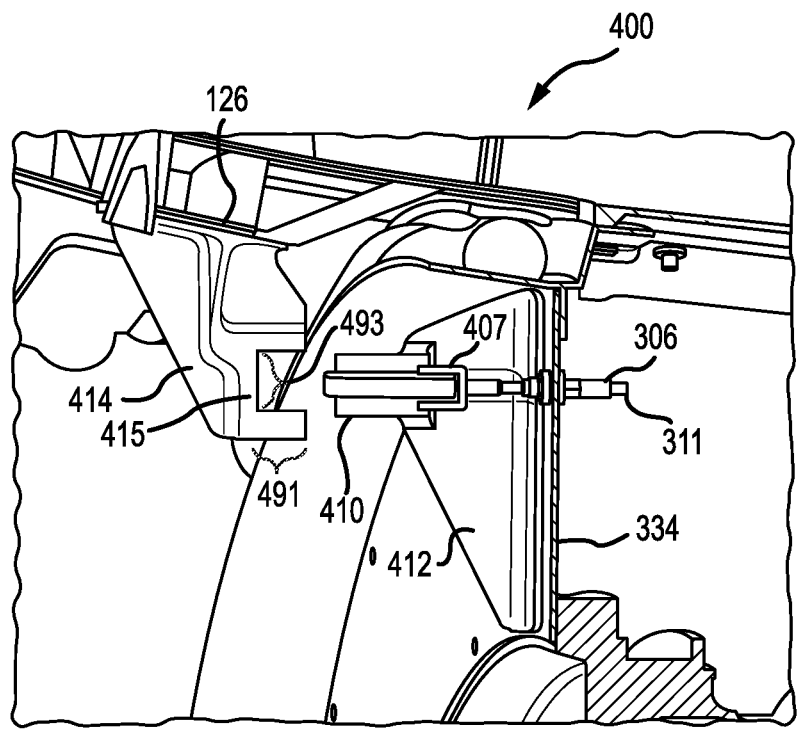
FIG. 4B illustrates an isometric view of an exemplary cam latch assembly in the open position, in accordance with various embodiments.
Figure 4C:
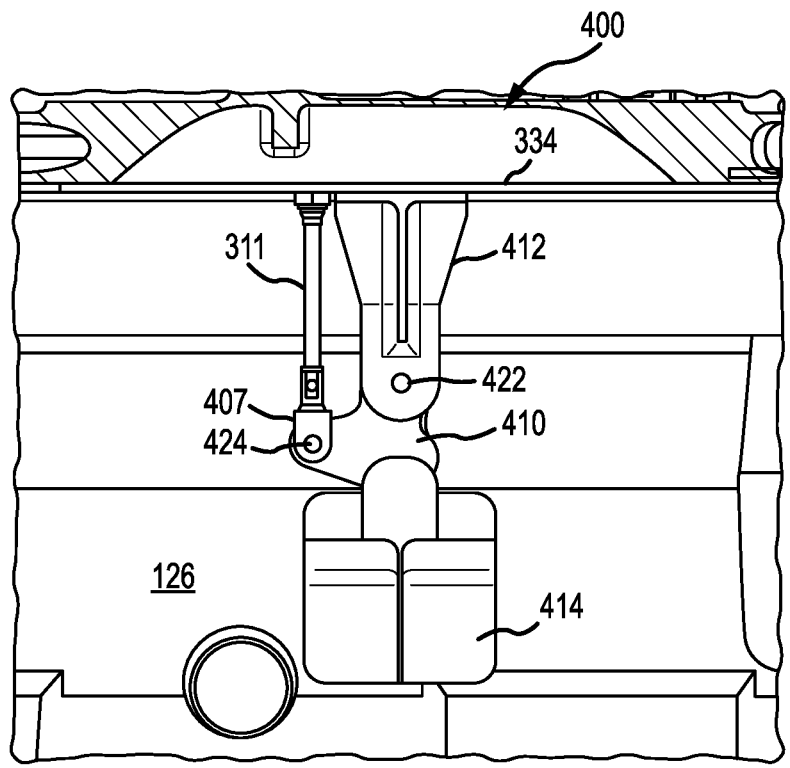
FIG. 4C illustrates a side view of an exemplary cam latch assembly in the closed position, in accordance with various embodiments.
Figure 4D:
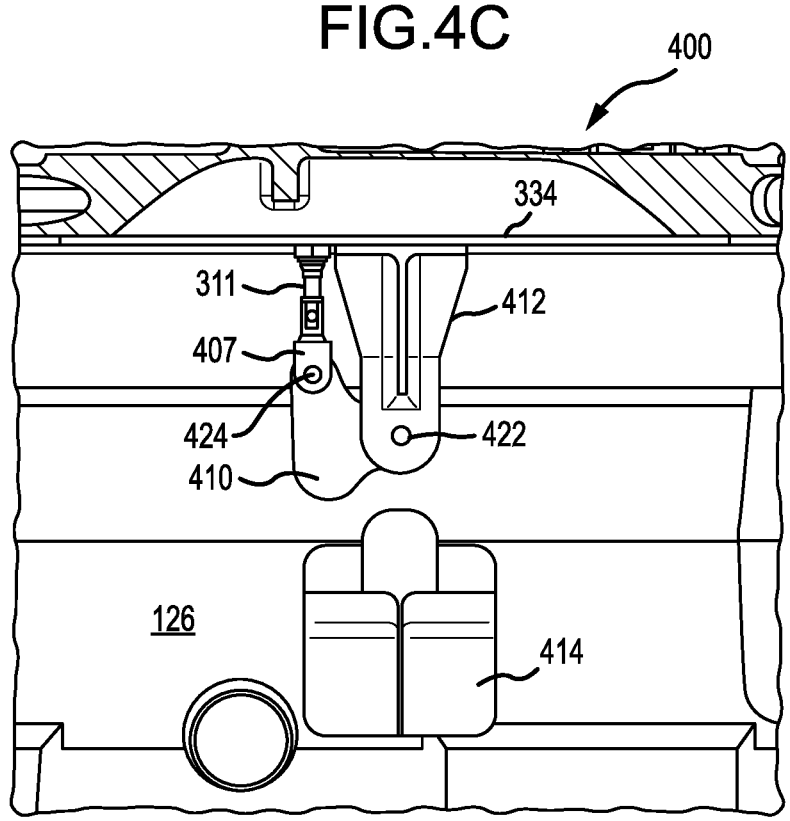
FIG. 4D illustrates a side view of an exemplary cam latch assembly in the open position, in accordance with various embodiments.

According to various embodiments, cam 410 may be configured to pivot in and out opening 415 when pivoting between a latched and unlatched position respectively. A latched position may be defined as a position where cam 410 is pivoted such that at least a portion of cam 410 is positioned in opening 415. An unlatched position may be defined as a position where cam 410 is pivoted such that no part of cam 410 is positioned in opening 415. Opening 415 may be defined as having a depth 491 and a width 493 as illustrated in FIG. 4B. The depth 491 and width 493 are selected to allow normal deflections between the IMC bulkhead 334 and the IFS 126.

According to various embodiments, cam 410 may rotate about pivoting pin 422 in response to a pushing or pulling force generated via cable 311. Cable 311 may be attached to cam 410 via fastener 407. Fastener 407 may be a clevis fastener or any other type of suitable fastener. Fastener pin 424 may be configured to attach fastener 407 to cam 410. Accordingly, cam 410 may pivot about fastener pin 424 during opening and closing of cam latch assembly 400.

As described above, a cable sleeve 306 may be provided to enclose cable 311 and form a flexible cable actuation system. Cable sleeve 306 may attach to on one end and extend from the cam latch mount 412 and attach to a handle assembly on the other end. The cable may be routed through one of the guide vanes 116 as previously described.

According to various embodiments, in response to latch handle 542 (FIG. 5A) being actuated from a closed to an open position, a tension force may be applied to cable 311, causing cam 410 to pivot about pivoting pin 422 and pivot out of opening 415, into an unlatched position. According to various embodiments, in response to latch handle 542 (FIG. 5A) being actuated from an open to a closed position, a compressive force may be applied to cable 311, causing cam 410 to pivot about pivoting pin 422 and pivot into opening 415 into a latched position.

As described above with respect to the pin latch assembly, during typical operating conditions, cam 410 does not contact cam latch mount 412. Cam 410 may deflect with IFS 126 and with respect to IMC bulkhead 334, without contacting cam latch mount 412. In that regard, cam latch assembly 400 provides a waiting-fail-safe load path between IFS 126 and IMC bulkhead 334.

According to various embodiments, during an overpressure event, the IFS 126 may deflect radially outwards. In response, provided cam latch assembly 400 is in a closed position, cam 410 may contact cam latch mount 412. In this manner, cam latch assembly 400 may prevent IFS deflection by creating a load path which may travel from IFS 126, through cam 410, through cam latch mount 412, and into IMC bulkhead 334. Accordingly, cam latch assembly 400 may prevent IFS deflection and maintain IFS 126 integrity during a burst event.

In addition to cam latch mount 412 being attached to IMC bulkhead 334 and cam retainer 414 being attached to IFS 126, cam latch mount 412 and cam retainer 414 may be located in inverse locations. In such an embodiment, the cable 311 could be routed along the radially inner surface of the IFS 126 to a handle located in the lower bifurcation 142.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A latch assembly located between a leading edge of an inner fixed structure (IFS) and an engine case comprising:
   a latch mount;
   a cam retainer including an opening;
   a cam attached to the latch mount via a pivoting pin, at least a portion of the cam positioned in the opening;
   a handle;
   a receiver, wherein the latch assembly is configured to be in a latched position when the cam is located within the receiver, wherein the receiver and the cam comprise a waiting-fail-safe load path when in the latched position, wherein the handle is coupled to a fan case, wherein the handle is coupled to the cam via a flexible cable, wherein the flexible cable is routed through a guide vane, the guide vane being located between the engine case and the fan case.

2. The latch assembly of claim 1, wherein the cam is configured to rotate about a pivot defined by the pivoting pin.

3. A latch assembly located between a leading edge of an inner fixed structure (IFS) and an engine case comprising:
   a latch mount;
   a cam retainer including an opening;
   a cam attached to the latch mount via a pivoting pin, at least a portion of the cam positioned in the opening;
   a handle;
   a receiver, wherein the latch assembly is configured to be in a latched position when the cam is located within the receiver, wherein the receiver and the cam comprise a waiting-fail-safe load path when in the latched position, wherein the cam is remotely actuated by a flexible cable, wherein the flexible cable is toured through a guide vane between the engine case and a fan case.

4. The latch assembly of claim 3, wherein the cam is configured to rotate about a pivot defined by the pivoting pin.

* * * * *